United States Patent
Feldman

(10) Patent No.: US 6,712,168 B2
(45) Date of Patent: Mar. 30, 2004

(54) VEHICLE IMPACT FORCE LIMITING SYSTEM

(76) Inventor: Yakov Feldman, 7705 Hampton Ave., Apt. 215, West Hollywood, CA (US) 90046

(*) Notice: Subject to any disclaimer, the term of this patent is extended or adjusted under 35 U.S.C. 154(b) by 0 days.

(21) Appl. No.: 10/039,859

(22) Filed: Oct. 20, 2001

(65) Prior Publication Data
US 2003/0075374 A1 Apr. 24, 2003

(51) Int. Cl.$^7$ .............................................. B60K 28/14
(52) U.S. Cl. .................................... 180/274; 180/271
(58) Field of Search ............................. 180/169, 271, 180/274, 275; 280/735; 340/435, 903, 904

(56) References Cited

U.S. PATENT DOCUMENTS

| | | | | |
|---|---|---|---|---|
| 5,646,613 A | * | 7/1997 | Cho | 340/903 |
| 6,031,449 A | * | 2/2000 | Laporte et al. | 340/436 |
| 6,106,038 A | * | 8/2000 | Dreher | 293/118 |
| 6,191,686 B1 | * | 2/2001 | Gabriel | 340/435 |
| 6,314,889 B1 | * | 11/2001 | Smith | 102/530 |
| 6,315,323 B1 | * | 11/2001 | Pack, Jr. | 280/743.2 |
| 6,408,237 B1 | * | 6/2002 | Cho | 701/45 |

* cited by examiner

Primary Examiner—David R. Dunn

(57) ABSTRACT

A vehicle impact force limiting system including at least one gas generator attached to a vehicle and adapted to generate or produce gas and to discharge a flow of gas forward in a lengthwise direction of the vehicle into an atmosphere when the gas generator is activated or actuated during a vehicle frontal collision or a rear-impact crash. The gas flow is adapted to generate or produce a force of reaction, applied to the vehicle and directed backward in an opposite direction to driving and to inertial forces of the vehicle, thereby reducing the driving and inertial forces and the impact of the vehicle. The reduced impact force reduces damage to the vehicle and injury to occupants of the vehicle. In an emergency or before a vehicle collision, the system allows the vehicle occupant to activate or actuate the gas generator to slow down or stop the vehicle.

9 Claims, 2 Drawing Sheets

VEHICLE IMPACT FORCE LIMITING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to a vehicle impact force limiting system, in particular to a gas impact force limiting system which discharges a flow of gas forward in a lengthwise or longitudinal direction into an atmosphere and which reduces a driving and an impact forces during a vehicle collision.

Frontal impacts are the number one fatality and injury-causing mode of crash, resulting in 64 percent of all driver and right-front passenger fatalities and 65 percent of all driver and right-front passenger injuries.

To help vehicle occupants survive the tremendous forces of a crash, vehicle designers have developed numerous safety features and systems.

For example, modern vehicles have front and rear "crush zones" that are designed to deform or crumple in a front or rear-end collision. The crumpling lengthens the duration of the crash, and helps absorb and dissipate crash energy, which lowers the rate of deceleration in the vehicle occupant compartment.

A vehicle's ability to protect an occupant in a crash depends on its ability to absorb the force of impact rather than transfer it to the occupant.

When a frontal impact is limited to crushable parts, the rate of deceleration is usually low. However, when an impact involves harder structural parts, the rate of deceleration is usually high.

In a severe frontal collision, impact forces are so great that structures in the front of the vehicle reach their limit of crumpling, and the impact forces begin to deform the occupant cabin.

Unfortunately, no current safety system can provide complete occupant protection in severe frontal collisions, and very severe frontal collisions can cause more serious occupant's injuries, including fatal injuries—even when seat belts are properly worn and the air bags deploy.

BRIEF SUMMARY OF THE INVENTION

This invention is directed to a vehicle impact force limiting system for reducing a driving, an inertial, and an impact forces during a vehicle frontal collision or a rear-impact crash.

The first object of the present invention is to provide a vehicle impact force limiting system which reduces damage to the vehicle and injury to occupants of the vehicle during a vehicle frontal collision.

The second object of the present invention is to provide a vehicle impact force limiting system which reduces the sudden relative motion of the head and neck that causes many whiplash injuries during a rear-impact crash. Many of the whiplash injuries with prolonged symptoms occur in rear impacts in which the sudden forward acceleration of an occupant's torso causes the neck to change shape because the head doesn't move with the torso.

The vehicle impact force limiting system comprises: means for sensing a frontal collision of a vehicle, means for sensing a rear-impact crash of a vehicle, at least one gas generator, at least one guide device or nozzle, and a switch in the occupant's compartment to activate or actuate the gas generator(s) before a vehicle collision or in an emergency, by an occupant of the vehicle, to slow down or stop the vehicle.

The at least one gas generator with its guide device or nozzle is located outside the vehicle's crush zone which is designed to buckle and bend in a crash to absorb the force of the crash, and this location of the at least one gas generator is designed to exclude a direct contact with an object and a damage in a collision.

The gas generator is coupled to the guide device or nozzle and is adapted to generate or produce gas at the beginning of a direct contact with an object in a collision and to discharge or expel a flow of gas forward in a lengthwise or longitudinal direction, into the atmosphere, when the gas generator is activated or actuated during a vehicle collision.

The gas flow is adapted to generate or produce a force of reaction which is applied to the vehicle and directed backward in an opposite direction to driving and to inertial forces of the vehicle, thereby reducing the driving, inertial, and impact forces during the vehicle collision. The reduced driving, inertial, and impact forces reduce damage to the vehicle and injury to occupants of the vehicle during the collision.

The gas flow can have a predetermined, or an adjustable, or a modulative force or power based on crash severity.

The gas flow is directed or guided forward into the atmosphere through a guide device or nozzle which can be adjustable.

The guide device or nozzle has wall portions surrounding the gas generator. The wall portions define a guide device or a nozzle interior containing the gas generator substantially therein such that the gas generator is enclosed within the guide device or nozzle.

The switch in the occupant's compartment is designed to activate or actuate the gas generator before a vehicle collision or in an emergency, by an occupant of the vehicle, to generate or produce gas and to discharge the gas flow forward into the atmosphere, thereby reducing the driving force and slowing down or stopping the vehicle.

The vehicle impact force limiting system of the present invention operates either automatically or by the occupant of the vehicle.

For the automatic option, the gas generator is activated or actuated by means for sensing a vehicle frontal collision or by means for sensing a vehicle rear-impact crash.

For the occupant's operation option, the gas generator is activated or actuated before a vehicle collision or in an emergency by a switch in the occupant's compartment. This switch can be a manual switch, or a pedal switch which can be pressed with a foot. The manual and pedal switches are connected by wire to means for activating or actuating the gas generator. For activating or actuating the gas generator can be used and other devices.

The gas generator with its guide device or nozzle may be located on the roof or at any other suitable locations outside the crushable parts of the vehicle.

The gas generator is designed to generate a gas flow in a moderate to severe frontal collision or in rear-impact crash.

During a vehicle frontal collision, the driving or inertial force of the vehicle is directed forward in a lengthwise or longitudinal direction, while the reaction or reactive force of the gas flow is directed backward in an opposite lengthwise direction.

Thus, the reaction or reactive force of the gas flow reduces the frontal-impact force when means for sensing a vehicle frontal collision senses a collision of a selected or predetermined severity and activates or actuates the gas generator.

During a vehicle rear-impact crash, the impact force of the other vehicle is directed forward in a lengthwise or longitudinal direction of the impacted vehicle, while the reaction or reactive force of the gas flow of the impacted vehicle is directed backward in an opposite lengthwise direction.

Thus, the reaction or reactive force of the gas flow reduces the rear-impact force when the gas generator is activated or actuated by means for sensing a vehicle rear-impact crash of a selected or predetermined severity.

The objects and advantages of the vehicle impact force limiting system of the present invention, during a vehicle collision, are:

(a) to provide an impact force limiting system which reduces the impact force;

(b) to provide an impact force limiting system which minimizes any deformation of the occupant cabin;

(c) to provide an impact force limiting system which augments a vehicle ability to protect the occupants;

(d) to provide an impact force limiting system which lowers the rate of deceleration in the vehicle occupant compartment and reduces the severity of occupant's injuries during a vehicle frontal collision; and (e) to provide an impact force limiting system which reduces the sudden forward acceleration of an occupant's torso and helps protect the occupant from whiplash injuries during a vehicle rear-impact crash.

Additional objects, advantages, and features of the present invention will become apparent from the following detailed description, taken together with the accompanying drawings.

BRIEF DESCRIPTION OF THE SEVERAL VIEWS OF THE DRAWING

The present invention, both as to its structure and manner of operation, may best be understood by referring to the following detailed description, taken in accordance with the accompanying drawings in which.

DETAILED DESCRIPTION OF THE INVENTION

Figure 1:
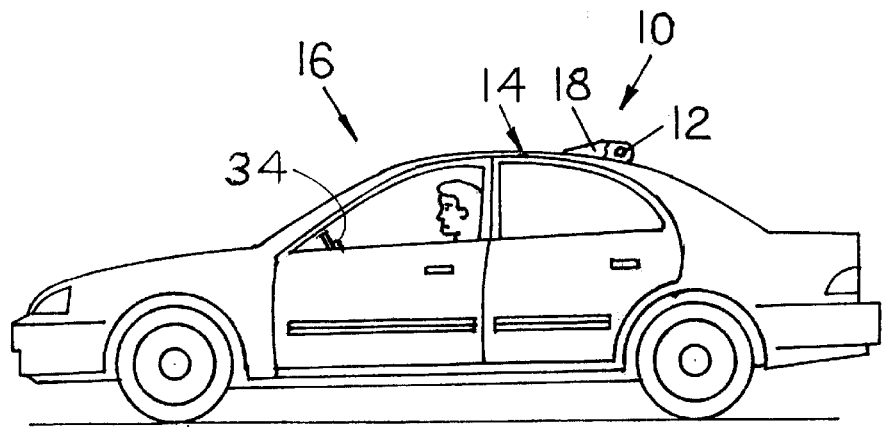
FIG. 1 is a side view of a vehicle with a gas generator located on the roof of the vehicle and adapted to direct a gas flow forward in a lengthwise direction in accordance with the present invention, shown in a condition in which the impact force limiting system has not been activated.
Figure 2:
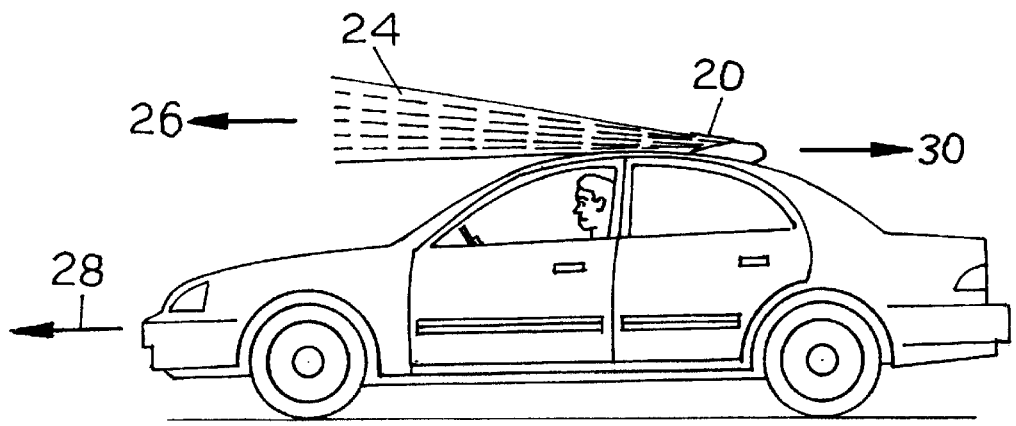
FIG. 2 is a view similar to FIG. 1, but showing the impact force limiting system in an activated condition and with arrows showing the direction of the gas flow, of the frontal-impact force, and of the reactive force during a vehicle frontal collision.

Referring first to FIGS. 1 and 2 there is shown a side view of a vehicle 16 with a impact force limiting system 10 of the present invention for reducing the impact force during a vehicle frontal collision.

Figure 3:
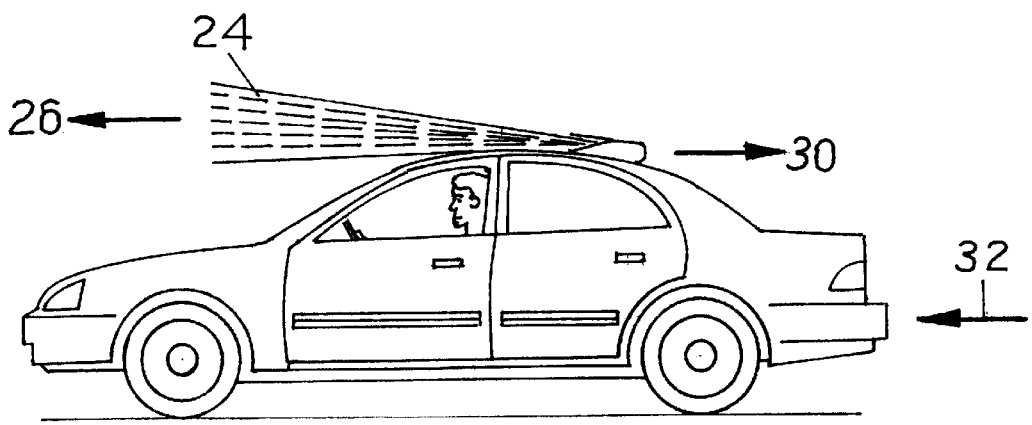
FIG. 3 is a view similar to FIG. 1, but showing the impact force limiting system in an activated condition and with arrows showing the direction of the gas flow, of the rear-impact force, and of the reactive force during a vehicle rear-impact crash.

Referring next to FIGS. 1 and 3 there is shown a side view of the vehicle 16 with the impact force limiting system 10 of the present invention for reducing the impact force during a vehicle rear-impact crash.

Figure 4:
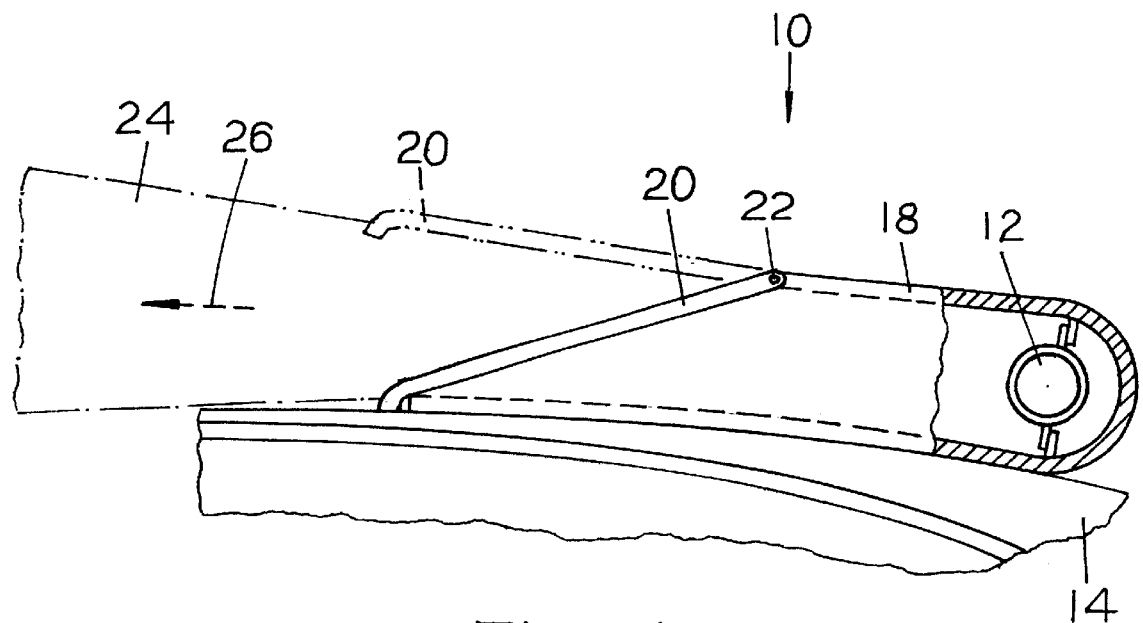
FIG. 4 is an enlarged side view of the gas generator with its guide device or nozzle of FIG. 1, shown for a usual condition in continuous lines and for activated condition in phantom lines.
Figure 5:
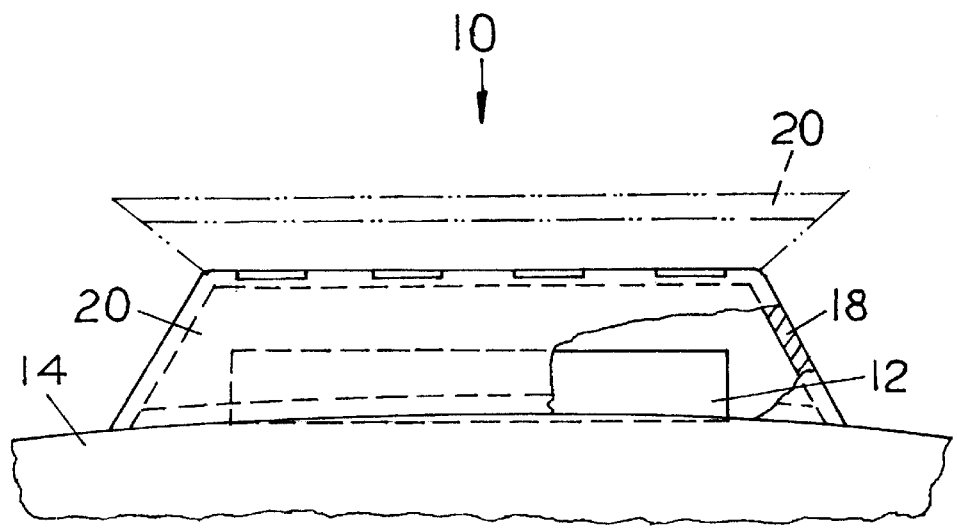
FIG. 5 is a front view of the gas generator with its guide device or nozzle of FIG. 4, shown for a usual condition in continuous lines and for activated condition in phantom lines.

The vehicle impact force limiting system 10 (FIG. 1, 4, and 5) comprises: means for sensing a frontal collision of a vehicle (not shown), means for sensing a rear-impact crash of a vehicle (not shown), at least one gas generator 12, at least one guide device or nozzle 18 attached to the top or roof 14 of the vehicle 16, a cover 20 with a hinge 22, and a switch 34 in the occupant's compartment to activate or actuate the gas generator 12 before a vehicle collision or in an emergency, by an occupant of the vehicle, to slow down or stop the vehicle 16.

The at least one gas generator 12 with its guide device or nozzle 18 is located outside the vehicle's crush zone which is designed to buckle and bend in a crash to absorb the force of the crash, and this location of the at least one gas generator is designed to exclude a direct contact with an object and a damage in a collision.

The guide device or nozzle 18 is directed forward in a lengthwise or longitudinal direction of the vehicle 16.

The gas generator 12 is coupled to the guide device or nozzle 18 and is adapted to generate or produce gas at the beginning of a direct contact with an object in a collision and to discharge or expel a flow of gas 24 forward in a lengthwise or longitudinal direction 26 (FIGS. 2 and 3), into the atmosphere, when the gas generator 12 is activated or actuated during a vehicle collision.

The gas flow 24 is adapted to generate or produce a force of reaction 30 which is applied to the vehicle 16 and directed backward in an opposite direction to driving and to inertial forces 28 (FIG. 2) of the vehicle 16, thereby reducing the driving, inertial, and impact forces during the vehicle collision. The reduced driving, inertial, and impact forces reduce damage to the vehicle and injury to occupants of the vehicle during the collision.

The gas flow 24 can have a predetermined, or an adjustable, or a modulative force or power based on crash severity.

The gas generator 12 contains chemicals for igniting to generate or produce gas for discharge upon the existence of vehicle conditions. The gas generator 12 is rigid and preferably has an axially elongated body including ports (not shown) through which the generator gas discharges.

The gas flow 24 is directed or guided forward into the atmosphere through a guide device or nozzle 18 which can be adjustable.

The guide device or nozzle 18 has wall portions surrounding the gas generator 12. The wall portions define a guide device or a nozzle interior containing the gas generator 12 substantially therein such that the gas generator is enclosed within the guide device or nozzle 18.

The guide device or nozzle 18 includes a cover 20 (FIGS. 4 and 5) which closes the front opening of the guide device or nozzle and can be pivoted about hinge 22. The cover 20 is adapted to permit discharging or the gas flow out. The guide device or nozzle opening can have an elongated shape or other shapes.

The switch 34 in the occupant's compartment is designed to activate or actuate the gas generator 12 before a vehicle collision or in an emergency, by an occupant of the vehicle 16, to generate or produce gas and to discharge the gas flow 24 forward into the atmosphere, thereby reducing the driving force 28 and slowing down or stopping the vehicle 16.

The vehicle impact force limiting system 10 of the present invention operates either automatically or by the occupant of the vehicle.

For the automatic option, the gas generator 12 is activated or actuated by means for sensing a vehicle frontal collision (not shown) or by means for sensing a vehicle rear-impact crash (not shown).

For the occupant's operation option, the gas generator 12 is activated or actuated before a vehicle collision or in an emergency by a switch in the occupant's compartment. This switch can be a manual switch 34 shown on the steering wheel (FIG. 1), or a pedal switch (not shown) which can be pressed with a foot. The manual and pedal switches are connected by wire (not shown) to means for activating or actuating the gas generator 12. For activating or actuating the gas generator 12 can be used and other devices (not shown).

Referring to FIGS. 2–5, under automatic operation, when the gas generator 12 is activated or actuated upon a signal from a sensor (not shown), or under manual operation, when the driver perceives an imminent collision or a danger and presses the manual switch 34 (FIG. 1), the gas generator 12 instantly generates or produces gas which puts pressure on the cover 20 (FIGS. 2–5) pushing it forward pivoting about hinge 22, such that the gas flow 24 may flow out through the opening of the guide device or nozzle 18. The activated or actuated gas generator 12 discharges or expels the gas flow 24 forward in a lengthwise or longitudinal direction 26.

The gas generator 12 is designed to generate a gas flow 24 (FIGS. 2 and 3) in a moderate to severe frontal collision or in rear-impact crash.

During a vehicle frontal collision, the driving or inertial force 28 (FIG. 2) of the vehicle 16 is directed forward in a lengthwise or longitudinal direction, while the reaction or reactive force 30 of the gas flow 24 is directed backward in an opposite lengthwise direction.

Thus, the reaction or reactive force 30 of the gas flow 24 reduces the frontal-impact force 28 which lowers or reduces the rate of deceleration in the vehicle occupant compartment or cabin and reduces the severity of occupant's injuries in a vehicle frontal collision.

During a vehicle rear-impact crash, the impact force 32 (FIG. 3) of the other vehicle is directed forward in a lengthwise or longitudinal direction of the impacted vehicle 16, while the reaction or reactive force 30 of the gas flow 24 of the impacted vehicle 16 is directed backward in an opposite lengthwise direction.

Thus, the reaction or reactive force 30 of the gas flow 24 reduces the rear-impact force 32 when the gas generator 12 is activated or actuated by means for sensing a vehicle rear-impact crash of a selected or predetermined severity. The reduced rear-impact force 32 lowers the rate of sudden forward acceleration in the vehicle occupant compartment and reduces the severity of occupant's whiplash injuries during a rear-impact crash.

In comparison with current safety systems in existing and new vehicles which cannot provide complete occupant protection in sever frontal collisions, and in very severe frontal collisions can cause serious occupant injuries, including fatal injuries -even when seat belts are properly worn and the air bags deploy, the present invention of the vehicle impact force limiting system will allow to protect a great number of occupants from receiving serious or fatal injuries.

While there has been shown and described preferred embodiment of the vehicle impact force limiting system of this invention, it is understood that various changes and modifications may be made by those skilled in the art without departing from the invention. The invention is defined in the following claims.

I claim:

1. A vehicle impact force limiting system comprising:
   at least one gas generator attached to a vehicle and adapted to produce gas in the beginning of a direct contact with an object in a collision and to discharge a flow of said gas forward into an atmosphere when a force of said collision acts on said vehicle and activates said at least one gas generator;
   said at least one gas generator being located outside the vehicle's crush zone which is designed to absorb a force of a crash, and said location of said at least one gas generator being designed to exclude a direct contact with an object and a damage in a collision;
   said gas flow being adapted to generate a force of reaction, applied to said vehicle and directed backward in an opposite direction to driving and to inertial forces of said vehicle, thereby reducing said driving and inertial forces and an impact of said vehicle during said action of a force of a collision on said vehicle,
   whereby said reduced driving, inertial, and impact forces reduce damage to said vehicle and injury to occupants of said vehicle.

2. The vehicle impact force limiting system of claim 1 wherein: said gas flow is adapted to reduce said inertial force and the front-impact of said vehicle during a frontal vehicle collision.

3. The vehicle impact force limiting system of claim 1 wherein: said gas flow is adapted to decrease the forces inside said vehicle during a rear-end collision.

4. The vehicle impact force limiting system comprising:
   at least one gas generator attached to a vehicle and adapted to produce gas at the beginning of a direct contact with an object in a collision and to discharge a flow of said gas forward into an atmosphere when said at least one gas generator is activated during an action of a force of an impact on said vehicle in a vehicle collision of a selected severity;
   said at least one gas generator being disposed outside the crush zone of said vehicle, which is adapted to absorb a force of a collision, and said disposition of said at least one gas generator being designed to exclude a direct contact with an object and a damage in said vehicle collision;
   said gas flow being adapted to generate a force of reaction, applied to said vehicle and directed backward in an opposite direction to inertial force of said vehicle, thereby reducing said inertial force and an impact of said vehicle and decreasing the forces inside said vehicle during said action of a force of an impact on said vehicle in said vehicle collision of selected severity, whereby said reduced inertial and impact forces reduce damage to said vehicle and injury to occupants of said vehicle during said collision.

5. The vehicle impact force limiting system of claim 4, wherein: said gas flow is adapted to reduce said inertial force and the front-impact of said vehicle during a frontal vehicle collision.

6. The vehicle impact force limiting system of claim 4 wherein: said gas flow is adapted to reduce the rear-impact of said vehicle during a rear-end collision.

7. A vehicle impact force limiting system comprising:

at least one gas generator attached to a vehicle and adapted to generate gas at the beginning of a direct contact with an object in a collision and to discharge a flow of said gas forward and longitudinally of said vehicle into an atmosphere when a force of an impact acts on said vehicle and activates said at least one gas generator during a vehicle collision;

said at least one gas generator being located outside the vehicle's crush zone which is designed to buckle and bend in a crash to absorb the force of said crash, and said location of said at least one gas generator is designed to exclude a direct contact with an object and a damage in a collision;

said gas flow being adapted to produce a force which is applied to said vehicle and directed backward in an opposite direction to inertial force of said vehicle, thereby reducing said inertial force and a severity of an impact of said vehicle when said force of an impact acts on said vehicle during said vehicle collision.

whereby said reduced inertial and impact forces minimize damage to said vehicle and injury to occupants of said vehicle during said collision.

8. The vehicle impact force limiting system of claim 7 wherein: said gas flow is adapted to reduce said inertial movement and the front-impact of said vehicle during a frontal vehicle collision.

9. The vehicle impact force limiting system of claim 7 wherein: said gas flow is adapted to reduce the rear-impact of said vehicle during a rear-end collision.

* * * * *